US010050961B2

United States Patent
Kaladgi et al.

(10) Patent No.: US 10,050,961 B2
(45) Date of Patent: Aug. 14, 2018

(54) NETWORK DEVICE AUTHENTICATION BASED ON HASHING CONTENT OF SEQUENTIAL MESSAGES

(71) Applicant: CA, INC., New York, NY (US)

(72) Inventors: Jameel Ahmed Kaladgi, Kavalbyrasandra (IN); Praveen Kumar Thakur, Seegehalli Village (IN); Kiran Kumar B. S., Thyagarajanagar (IN)

(73) Assignee: CA, INC., New York, NY (US)

( * ) Notice: Subject to any disclaimer, the term of this patent is extended or adjusted under 35 U.S.C. 154(b) by 269 days.

(21) Appl. No.: 15/003,241

(22) Filed: Jan. 21, 2016

(65) Prior Publication Data

US 2017/0214689 A1     Jul. 27, 2017

(51) Int. Cl.
    *H04L 29/06*      (2006.01)

(52) U.S. Cl.
    CPC ........ *H04L 63/0869* (2013.01); *H04L 63/107* (2013.01)

(58) Field of Classification Search
    CPC .......................... H04L 63/107; H04L 63/0869
    USPC .............................................................. 726/9
    See application file for complete search history.

(56) References Cited

U.S. PATENT DOCUMENTS

| 7,275,109 | B1 | 9/2007 | Lee | |
| 8,296,565 | B2 | 10/2012 | Taylor | |
| 8,713,311 | B1 * | 4/2014 | Roskind | H04L 63/061 713/161 |
| 2010/0275253 | A1 * | 10/2010 | Hirano | H04W 60/005 726/9 |
| 2012/0017079 | A1 * | 1/2012 | Mraz | H04L 9/3236 713/153 |
| 2014/0040194 | A1 * | 2/2014 | Krasensky | H04L 47/34 707/613 |
| 2015/0373015 | A1 * | 12/2015 | Mary | G06F 21/335 726/9 |
| 2016/0286487 | A1 * | 9/2016 | Sachs | H04W 4/005 |

OTHER PUBLICATIONS

Tashiro, "A secure Protocol Consisting of Two Different Security-Level Message Authentications over CAN", 2017, IEEE, pp. 1520-1524.*

* cited by examiner

*Primary Examiner* — Thanhnga B Truong
*Assistant Examiner* — Gregory Lane
(74) *Attorney, Agent, or Firm* — Sage Patent Group

(57) ABSTRACT

A method, performed by an authentication processor of a first network device, includes receiving a first message through a network interface circuit from a second network device. The first message contains a first data unit to be operated upon by the first network device. A second message is received through the network interface circuit from the second network device. The second message contains a reported authentication token for the second network device and a second data unit to be operated upon by the first network device. The first message is received before receipt of the second message. A check authentication token is generated based on hashing the first data unit. A command that controls operation of the first network device is selectively performed on the second data unit based on whether the check authentication token matches the reported authentication token.

18 Claims, 6 Drawing Sheets

NETWORK DEVICE AUTHENTICATION BASED ON HASHING CONTENT OF SEQUENTIAL MESSAGES

BACKGROUND

The present disclosure relates to electronic communications between network devices and more particularly to authenticating the network devices.

Communications between network devices, such as between client devices and server devices, over data networks frequently involve sensitive information and/or commands. Client devices may be providing credit card numbers or other personal data. Server devices may be providing similar sensitive data, and may also issue commands that client devices should not use or respond to if the commands are received from network devices which are misrepresenting their identities to operate as imposters of valid server devices. Information and commands are frequently carried over common networks that are freely accessible to numerous persons, some of whom may unethically, and even illegally interfere with or use communications not intended for them. For example, an attacker could bombard a client with undesired messages, "listen in" on communications not intended for the attacker, and even prompt communication from the server or the client and have the response directed to the attacker.

An example of client-server communications is voice over IP (VoIP) telephony, with exemplary VoIP phones being "stimulus" devices. No intelligence resides in the client/phone other than for responding to commands or sending status. The client sends telephony state status such as on-hook/off-hook, and keypad closures, and accepts commands from the server. All other intelligence between the client and server is contained in the server. The call server maintains the telephony state, issues all commands, and writes directly to the display of the phone. These commands and status are issued over a common Internet Protocol (IP) network. Since the IP network is open to anyone who can connect to the network, there is a serious security concern because persons could easily issued commands to i2004 phones. Malicious persons could, e.g., deny service to the phone, disrupt phone service, or even take command of the phone. A possible, serious attack could involve an attacker turning on a microphone of the i2004 phone set, directing the audio from the microphone to the attacker's location, and listening to this audio. Using the technique, the attacker could listen in to any audio in the vicinity of the phone, such as conversations in the phone user's office, unbeknownst to the phone user.

SUMMARY

A method, performed by an authentication processor of a first network device, includes receiving a first message through a network interface circuit from a second network device. The first message contains a first data unit to be operated upon by the first network device. A second message is received through the network interface circuit from the second network device. The second message contains a reported authentication token for the second network device and a second data unit to be operated upon by the first network device. The first message is received before receipt of the second message. A check authentication token is generated based on hashing the first data unit. A command that controls operation of the first network device is selectively performed on the second data unit based on whether the check authentication token matches the reported authentication token.

A first network device includes a network device, an authentication processor, and a memory. The network interface communicates with a second network device through a data network. The memory is coupled to the authentication processor and stores computer readable program code that is executable by the authentication processor to receive a first message through the network interface circuit from the second network device. The first message contains a first data unit to be operated upon by the first network device. The computer readable program code is further executed by the authentication processor to receive a second message through the network interface circuit from the second network device. The second message contains a reported authentication token generated by the second network device and a second data unit to be operated upon by the first network device. The computer readable program code is further executed by the authentication processor to generate a check authentication token based on hashing the first data unit, and selectively perform a command on the second data unit that controls operation of the first network device based on whether the check authentication token matches the reported authentication token.

A computer program product includes a non-transitory computer readable storage medium having computer readable program code embodied in the medium that when executed by an authentication processor of a first network device causes the processor to perform operations. The operations include receiving a first message through a network interface circuit from a second network device. The first message contains a first data unit to be operated upon by the first network device. The operations further include receiving a second message through the network interface circuit from the second network device. The second message contains a reported authentication token for the second network device and a second data unit to be operated upon by the first network device. The first message is received before receipt of the second message. The operations further include generating a check authentication token based on hashing the first data unit, and selectively performing a command on the second data unit that controls operation of the first network device based on whether the check authentication token matches the reported authentication token.

Other methods, network devices, and computer program products according to embodiments of the inventive subject matter will be or become apparent to one with skill in the art upon review of the following drawings and detailed description. It is intended that all such additional methods, network devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to improving communication security between network devices. The communication security operations can be provided using low-computationally intensive software and without additional hardware in the transmitting and receiving network devices. Moreover, the communication security operations may be performed with minimal additional network communication overhead.

Figure 1:
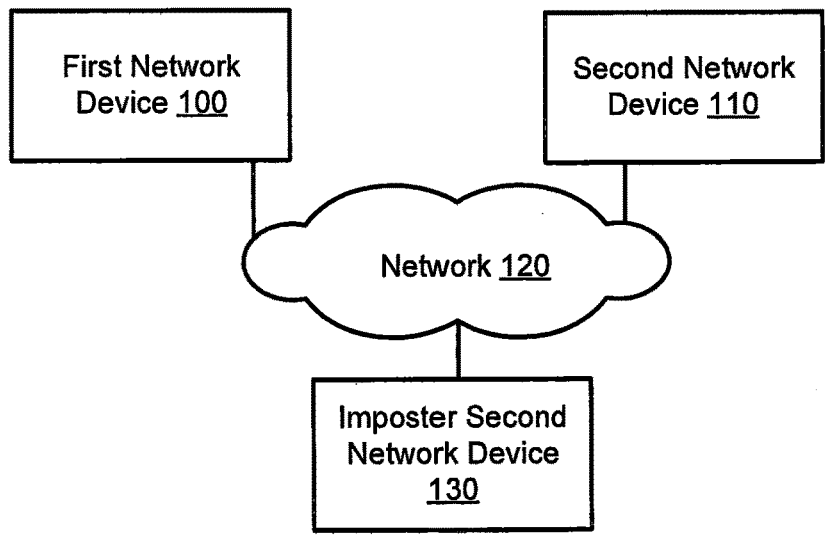
FIG. 1 is a block diagram of a pair of network devices that communicate through a data network and are configured to detect communications from an imposter network device according to some embodiments of the present disclosure.

FIG. 1 is a block diagram of a pair of network devices 100 and 110 that communicate through a data network 120 and are configured to detect communications from an imposter network device 130 according to some embodiments of the present disclosure. Referring to FIG. 1, the first network device 100 and the second network device 110 exchange messages through the data network 120. An imposter second network device 130 also communicates with the first network device 100 but configures its messages to appear as if they originated from the second network device 110. In this manner, the imposter second network device 130 can attempt to obtain control over the first network device 100 and/or access user information or other data that is accessible through the first network device 100 using access privileges that are reserved for use by the second network device 110.

In accordance with various embodiments herein, the first network device 100 receives a first message from the second network device 110. The first message contains a first data unit to be operated upon by the first network device 100. The first network device 100 subsequently receives a second message which may originate from the second network device 110 or the imposter second network device 130. The second message contains a reported authentication token for the second network device 110 and a second data unit to be operated upon by the first network device 100. To authenticate the source of the second message, the first network device 100 generates a check authentication token based on hashing the first data unit, and determines whether the check authentication token matches the reported authentication token received as content of the second message. The first network device 100 selectively performs a command on the second data unit that controls operation of the first network device 100 based on whether the check authentication token matches the reported authentication token.

A data unit may include, but is not limited to, a command that is to be performed by the receiving network device, an operand value that is to be operated on by a function performed by the receiving network device, a plurality of commands, a plurality of operand values, and/or other information that can be processed and stored by a receiving network device.

In some embodiments, the first network device 100 discards the second data unit responsive to the check authentication token not matching the reported authentication token. In sharp contrast, the first network device 100 provides the second data unit to an application programming interface of an application (e.g., 1072 in FIG. 10), responsive to the check authentication token matching the reported authentication token.

Figure 10:
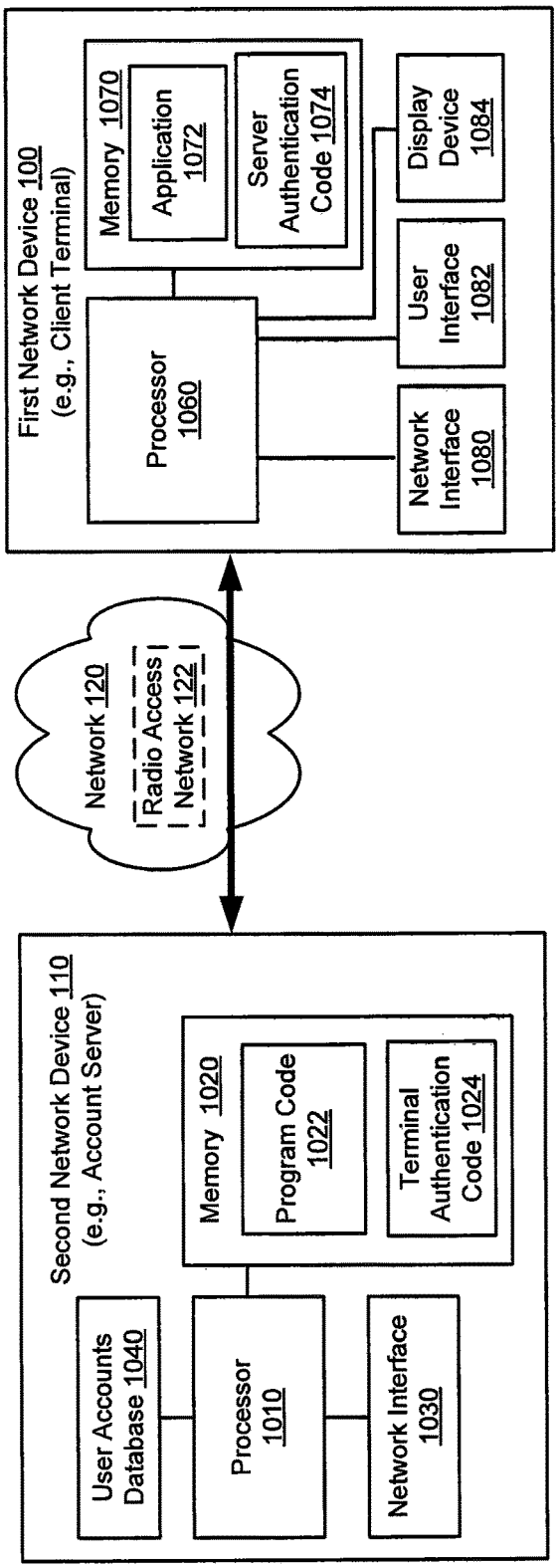
FIG. 10 is a block diagram of example network devices configured as an account server and a client terminal according some embodiments of the present disclosure.

In some other embodiments, responsive to the check authentication token not matching the reported authentication token, the first network device 100 prevents electronic access requested by the imposter second network device 130 to user information identified by the second data unit that is stored in a user information repository (e.g., 1040 in FIG. 10). In sharp contrast, the first network device 100 responds to the check authentication token matching the reported authentication token, by retrieving the user information identified by the second data unit from the user information repository, and communicating the user information toward the second network device 110.

In this manner, the first network device 100 can accurately authenticate the source of the second message using low-computationally intensive hashing and value comparison operations and without additional hardware and the first network device 100 and the second network device 110. Moreover, the communication security operations may be performed with minimal additional network communication overhead, reflected by the inclusion of a single hashing-based check authentication token in the second message according to some embodiments.

Figure 2:
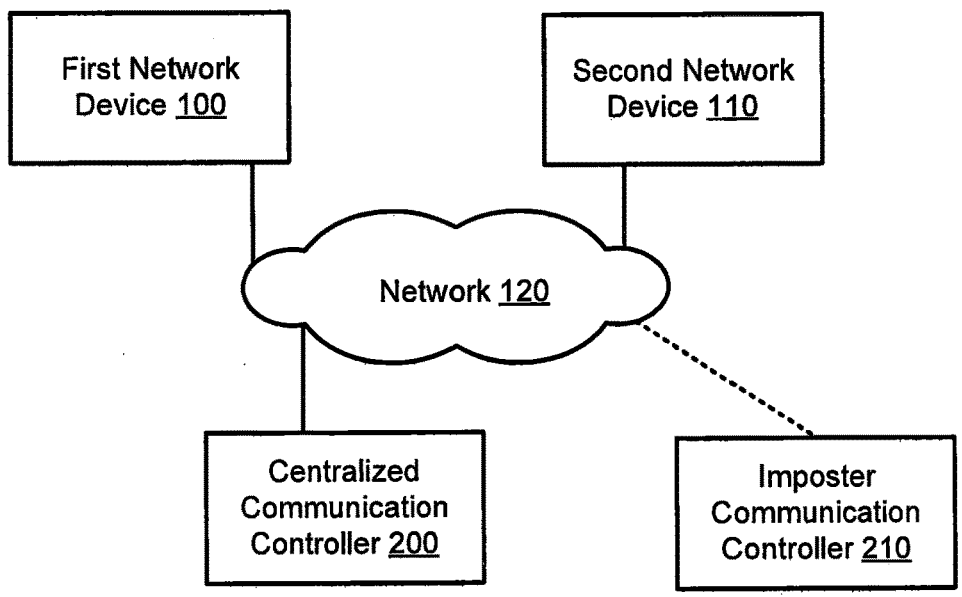
FIG. 2 is a block diagram of a pair of network devices that communicate through a data network via a centralized communication controller and detect communications from an imposter communication controller according to some embodiments of the present disclosure.

FIG. 2 is a block diagram of the network devices 100 and 110 that communicate through the data network 120 via a centralized communication controller 200 and detect communications from an imposter communication controller 210 according to some embodiments of the present disclosure. The centralized communication controller 200 may be, for example, an edge node of a communication routing network and/or an intermediate message router within a communication routing network. The centralized communication controller 200 can operate according to various embodiments disclosed herein to include a hashing-based check authentication token that the first network device 100 and the second network device 110 can use to determine whether the message properly passed-through the centralized communication controller 200 or improperly through the imposter communication controller 210.

Figure 3:
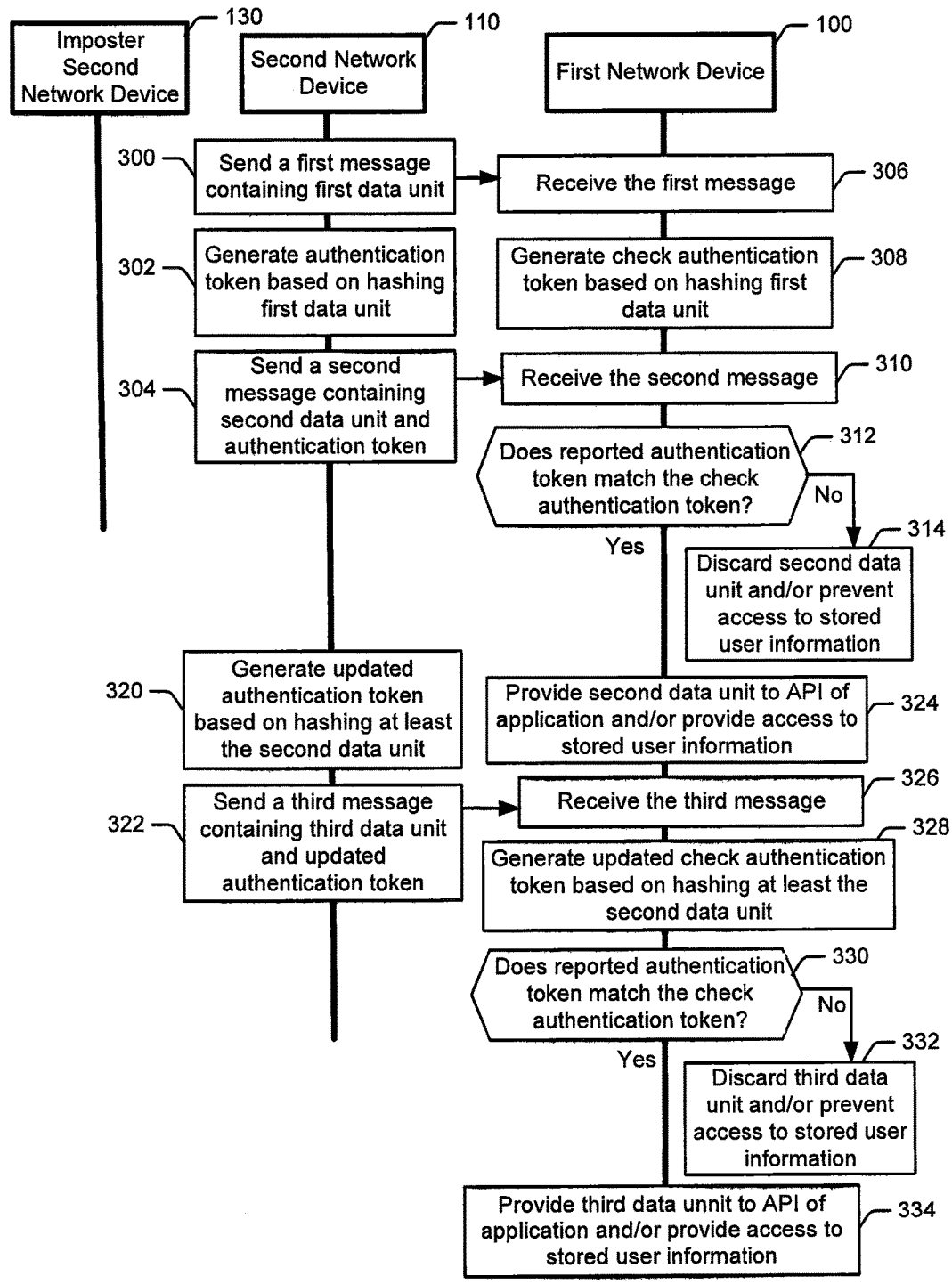
FIG. 3 illustrates a combined dataflow diagram and flowchart of operations that can be performed by the pair of network devices shown in FIG. 1 or FIG. 2 to authenticate sources of messages according to some embodiments of the present disclosure.

FIG. 3 illustrates a combined dataflow diagram and flowchart of operations that can be performed by the pair of network devices 100 and 110 shown in FIG. 1 or FIG. 2 to authenticate sources of messages according to some embodiments of the present disclosure.

Referring to FIG. 3, the second network device 110 sends (block 300) a first message containing a first data unit toward the first network device 100. The second network device 110 generates (block 302) an authentication token based on hashing the first data unit, and stores the authentication token in a local memory device of the second network device 110. The second network device 110 then sends (block 304) a second message containing a second data unit and the authentication token retrieved from the local memory device.

The first network device 100 receives (block 306) the first message and generates (block 308) a check authentication token based on hashing the first data unit. The first network device 100 stores the check authentication token in a local memory device of the first network device 100 for use in authenticating the source of a subsequently received message. The first network device 100 then receives (block 310) the second message and determines (block 312) whether the authentication token reported in the second message matches the check authentication token that was stored in the local memory device.

Responsive to determining that the check authentication token does not match the reported authentication token, the first network device 100 can discard (block 314) the second data unit and/or prevent (block 314) electronic access requested through the first message and/or the second message to user information identified by the second data unit that is stored in a user information repository that may be contained in the first network device 100 or communicatively accessible there through.

In sharp contrast, responsive to determining that the check authentication token matches the reported authentication token, the first network device 100 can provide (block 324) the second data unit to an application programming interface of an application that is processed by a processor of the first network device 100 or processed by another network node connected to the first network device 100, and/or can retrieve (block 324) the user information identified by the second data unit from the user information repository and communicate the user information toward the second network device 110.

In the example of FIG. 3, the first and second messages both originated from the second network device 110 so the reported authentication token should match the stored check authentication token. However, if the second message had been communicated by the imposter second network device 130, the first network device 100 would properly determine that the second message was not communicated by the second network device 110 because the second message would not contain an authentication token the matches the stored check authentication token. This failed authentication occurs because the imposter second network device 130 does not have access to content of the first message and, therefore, cannot hash the first data unit contained in the first message in order to generate the particular authentication token required for authentication as the second network device 110.

The described authentication process can be repeated for each message that is communicated between the second network device 110 and the first network device 100 so that the source of each message can be authenticated. In the example of FIG. 3, the second network device 110 generates (block 320) an updated authentication token based on hashing at least the second data unit, and sends (block 322) a third message containing a third data item and the updated authentication token. The updated authentication token may be generated based on hashing a combination of the second data unit and the first data unit. Similarly, the updated authentication token may be generated based on hashing a combination of any number of data units in any number of earlier received messages.

The first network device 100 receives (block 326) the third message, and generates (block 328) and updated check authentication token based on hashing at least the second data unit. The updated check authentication token may be generated based on hashing a combination of the second data unit and the first data unit, when the second network device 110 is expected to have performed a same hashing operation to generate the updated authentication token. The first network device 100 stores the updated check authentication token in the local memory device of the first network device 100. The first network device 100 then determines (block 330) whether the updated authentication token reported in the third message matches the updated check authentication token that was stored in the local memory device.

Responsive to determining that the updated check authentication token does not match the updated authentication token, the first network device 100 can discard (block 332) the third data unit and/or prevent (block 332) electronic access requested through the first, second, and/or third messages to user information identified by the third data unit that is stored in a user information repository that may be contained in the first network device 100 or accessible there through.

In sharp contrast, responsive to determining that the updated check authentication token matches the updated authentication token, the first network device 100 can provide (block 334) the third data unit to an application programming interface of an application that is processed by a processor of the first network device 100 or processed by another network node connected to the first network device 100, and/or can retrieve (block 334) the user information identified by the third data unit from the user information repository and communicate the user information toward the second network device.

The hashing operations referenced herein may be performed by providing the described value or combination of described values as input to a hashing algorithm, such as the MD-2 (message digest 2), MD-5, or SHA-1 (standard hashing algorithm 1) hash algorithms. These are non-limiting examples because other hashing algorithms or other coding functions may be used. Using the MD-2 or MD-5 hash algorithms, the hash result is a 16-bite (128-bit) value regardless of the length of the input value.

Figure 4:
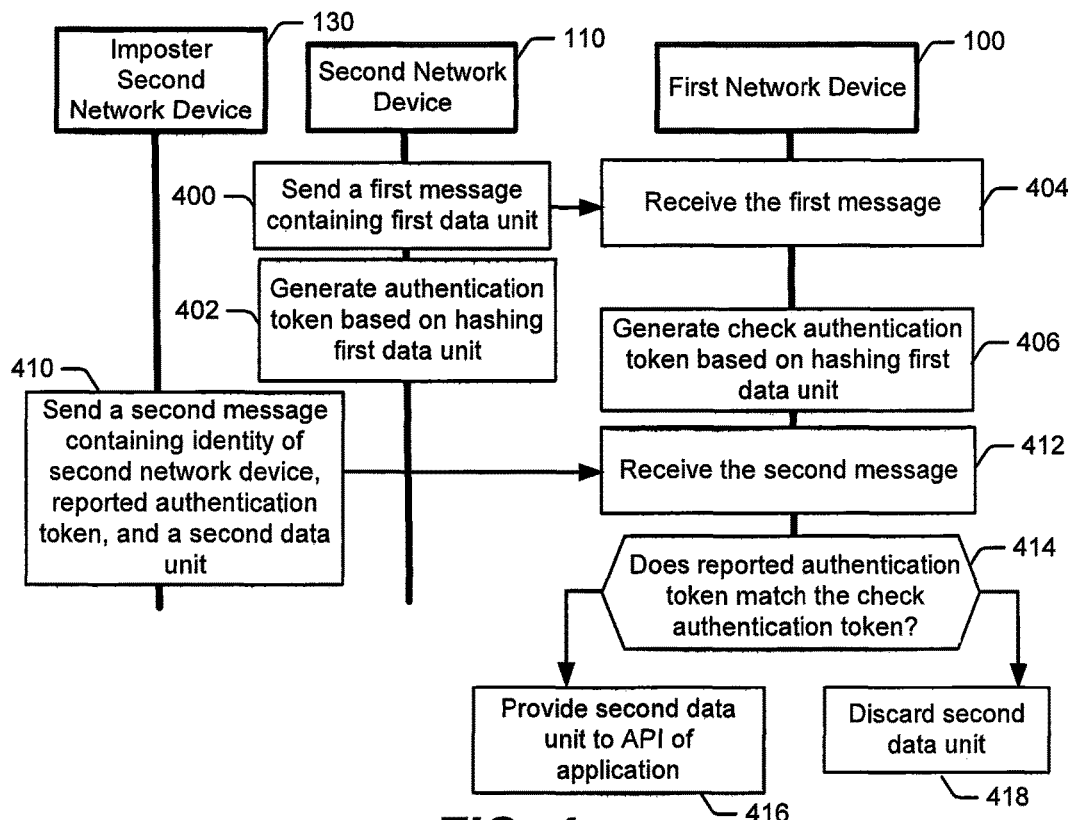
FIG. 4 illustrates a combined dataflow diagram and flowchart of operations that can be performed by the pair of network devices shown in FIG. 1 or FIG. 2 to detect communications from an imposter device according to some embodiments of the present disclosure.

In the example operations discussed with regard to FIG. 3 the imposter second network device 130 did not send a message to the first network device 100. FIG. 4 illustrates a combined dataflow diagram and flowchart of operations that can be performed by the first and second network devices 100 and 110 shown in FIG. 1 or FIG. 2 to detect communications from the imposter second network device 130 or other imposter device according to some embodiments of the present disclosure.

Referring to FIG. 4, the second network device 110 sends (block 400) a first message containing a first data unit toward the first network device 100. The second network device 110 generates (block 402) an authentication token based on hashing the first data unit, and stores the authentication token in a local memory device of the second network device 110. However, the second network device 110 does not send a second message containing the authentication token toward first network device 100. Instead, the imposter second network device 130 intervenes in communications between the second network device 110 and the first network device 100, by sending (block 410) a second message containing an identity of the second network device 110, an authentication token that is generated by the imposter second network device 130, and a second data unit that is to be operated upon by the first network device 100. Because the imposter second network device 130 does not have access to the first data unit, the authentication token generated by the imposter second network device 130 cannot have been generated based on hashing the first data unit.

The first network device 100 receives (block 404) the first message and generates (block 406) a check authentication token based on hashing the first data unit. The first network device 100 stores the check authentication token in a local memory device of the first network device 100 for use in authenticating the source of a subsequently received message. The first network device 100 then receives (block 412) the second message and determines (block 414) whether the authentication token reported in the second message matches the check authentication token that was stored in the local memory device.

Responsive to determining that the check authentication token does not match the reported authentication token, the first network device 100 can discard (block 418) the second data unit and/or prevent (block 418) electronic access requested through the first and/or second messages to user information identified by the second data unit that is stored in a user information repository that may be contained in the first network device 100 or communicatively accessible there through.

Because the check authentication token will not match the reported authentication token, the first network device 100 does not provide (block 416) the second data unit to an application programming interface of an application that is processed by a processor of the first network device 100 or processed by another network node connected to the first network device 100, and/or does not retrieve (block 416) the user information identified by the second data unit from the user information repository and communicate the user information toward the imposter second network device 130.

FIGS. 5-9 are flowcharts of operations that can be performed by one or both of the network devices 100 and 110 shown in FIGS. 1 and 2 to authenticate network device sources of messages according to some embodiments of the present disclosure.

In some embodiments the check authentication token is performed by hashing one or more data units that are selected from one or more earlier messages based on various operations disclosed below. These operations may provide increased levels of security in network communications with minor utilization of computational and storage resources of the sending and receiving network devices. The imposter second network device 130 is further prevented from generating a valid check authentication token because of its lack of knowledge of both the content of the earlier messages and, moreover, the particular rules used by the first network device 100 and the second network device 110 to select which one or more data units are used for hashing and associated authentication operations.

Figure 5:
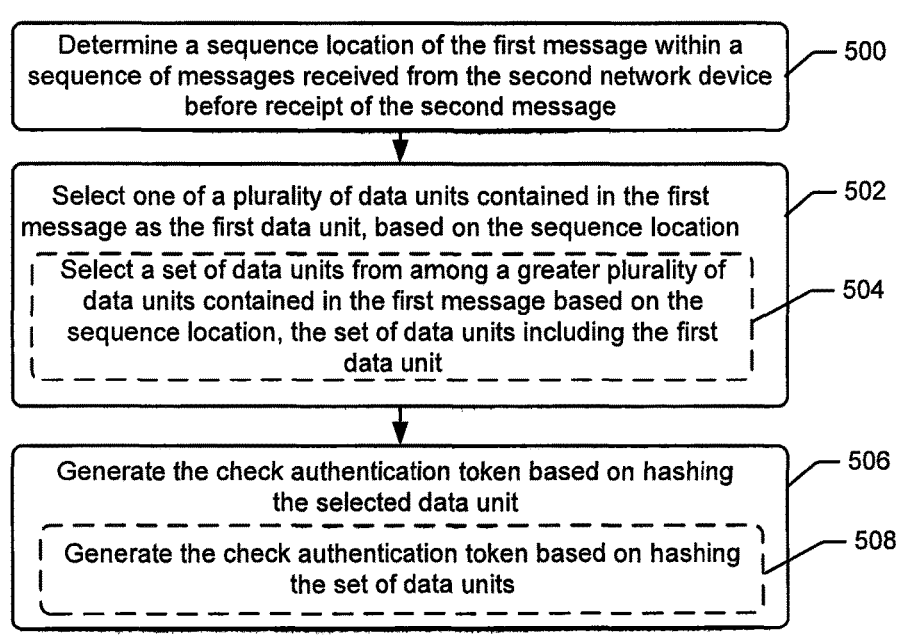
FIGS. 5-9 are flowcharts of operations that can be performed by one or both of the pair of network devices shown in FIGS. 1 and 2 to authenticate each other according to some embodiments of the present disclosure.

Referring to FIG. 5, the first network device 100 determines (block 500) a sequence location of the first message within a sequence of messages received from the second network device 110 before receipt of the second message, and selects (block 502) one of a plurality of data units contained in the first message as the first data unit, based on the sequence location. The first network device 100 then generates (block 506) a check authentication token based on hashing the selected data unit.

In some further embodiments, the first network device 100 determines the sequence location of the first message within a sequence of messages received from the second network device 110, by operations that include generating a count of a number of messages in the sequence received from the second network device during a same communication session established between the first network node and the second network node (e.g., during a temporary client-server session). The selection of one of the plurality of data units contained in the first message as the first data unit, based on the sequence location, includes selecting one of the plurality of data units contained in the first message as the first data unit, based on the count.

To generate a check authentication token based on hashing the first data unit, the first network device 100 may select (block 504) a set of data units from among a greater plurality of data units contained in the first message based on the sequence location, the set of data units including the first data unit, and generate (block 508) the check authentication token based on hashing the set of data units. Thus, a subset of data units contained in the first message is selected based on a defined operational rule for hashing to generate the check authentication token.

Figure 6:
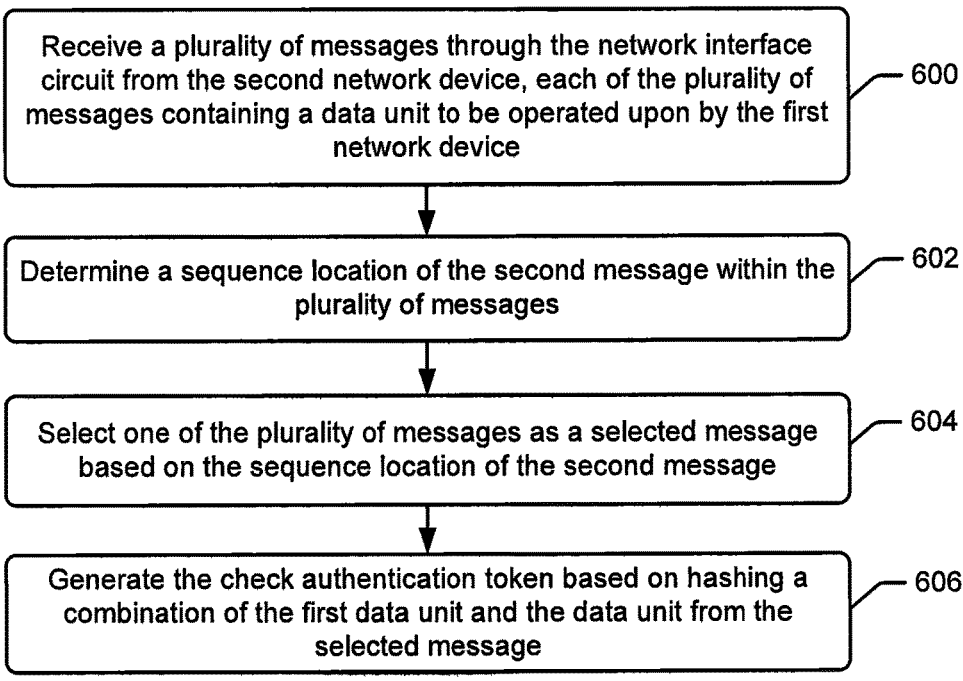
Figure 7:
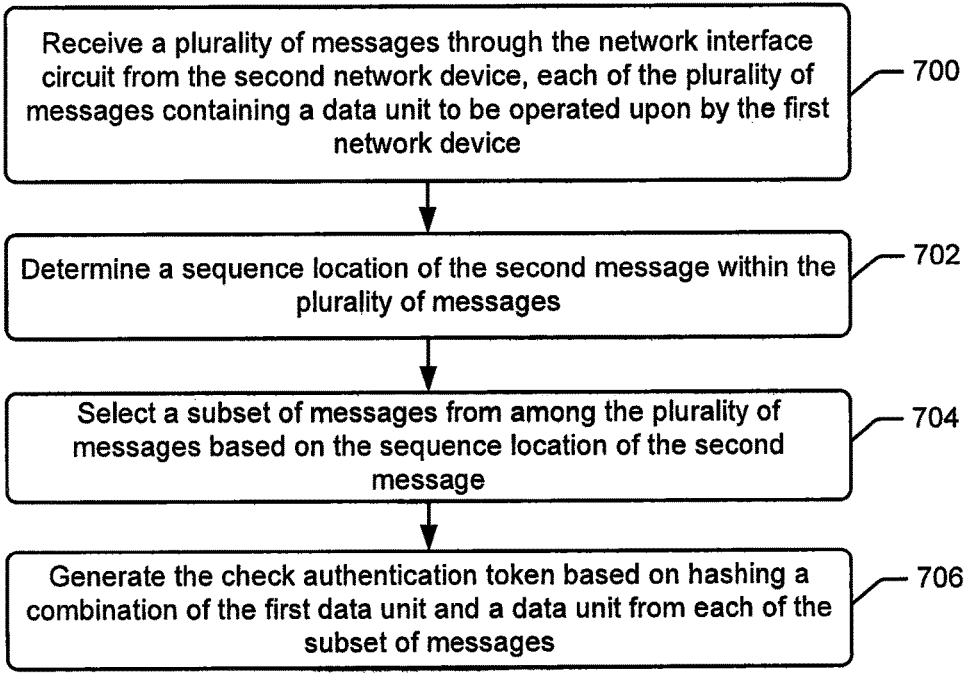

Referring to FIG. 6, the first network device 100 receives (block 600) a plurality of messages through a network interface circuit from the second network device 110. Each of the plurality of messages contains a data unit to be operated upon by the first network device 100. The first network device 100 determines (block 602) a sequence location of the second message within the plurality of messages, and selects (block 604) one of the plurality of messages as a selected message based on the sequence location of the second message. The first network device 100 then generates (block 606) the check authentication token based on hashing a combination of the first data unit and the data unit from the selected message. Thus, one or more data units contained in a message selected from among a plurality of earlier received messages, are hashed to generate the check authentication token which must match the reported authentication token contained in the received message in order for that received message to be determined to have been communicated by a valid source device.

These operations allow the first network device 100 to determine that each message in a sequence of messages has been communicated by a same source network device 110. Attempted intervention of another network device 130 by sending a message to the first network device 100 will be detected by the absence of a proper reported authentication token in that message.

Referring to FIG. 6, the first network device 100 receives (block 700) a plurality of messages through the network interface circuit from the second network device. Each of the plurality of messages contains a data unit to be operated upon by the first network device 100. The first network device 100 determines (block 702) a sequence location of the second message within the plurality of messages, and selects (block 704) a subset of messages from among the plurality of messages based on the sequence location of the second message. The first network device 100 then generates (block 706) the check authentication token based on hashing a combination of the first data unit and a data unit from each of the subset of messages. Thus, one or more data units contained in plurality of separate messages, which are received from the second network device 110, are hashed to generate the check authentication token which must match the reported authentication token contained in the received message in order for that received message to have a correctly validated source device. It is noted for clarity that data units of non-selected messages which may intervene between the selected messages, are not used as inputs for hashing to generate the check authentication token. In one example embodiment, all messages at odd numbered locations in a sequence have data units that are combined and hashed, while all messages at even numbered locations in the sequence have data units that are not hashed or otherwise used to generate the check authentication token.

In some further embodiments, the first network device 100 receives a plurality of messages through the network interface circuit from the second network device 110. Each of the plurality of messages contains a data unit to be operated upon by the first network device 100. For each of the plurality of messages that are received, the first network device 100 generates the check authentication token based on hashing a combination of the data unit in the message received and an earlier check authentication token generated based on hashing the data unit in an earlier received message.

The check authentication token can be generated based on hashing other characteristics associated with the one or more of the messages containing the data unit(s) to be hashed. For example, in the embodiments of FIGS. 8 and 9, hashing is performed on a combination of message timing and the data units to generate the check authentication token.

One embodiment, the first network device 100 determines a first message timing value based on a time of receipt of the first message by a network interface circuit of the first network device 100. The first network device 100 then generates the check authentication token based on hashing a combination of the first data unit and the first message timing value. Accordingly, the second network device 110 can demonstrate its authenticity to the first network device 100 by controlling timing of its communication of the first message relative to a defined timing event, and then generating the reported authentication token (e.g., block 304) based on hashing a combination of the first data unit and the elapsed time. The first network device 100 similarly hashes the first data unit and its measurement of the timing of receipt of the first message relative to a defined timing event. The first and second network devices 100 and 110 may round the timing values that are provided to their respective hashing algorithm using a same rounding technique so that determined timing values within a threshold range of one another will provide a same timing value to the hashing algorithm and result in the hashing output being equal.

Figure 8:
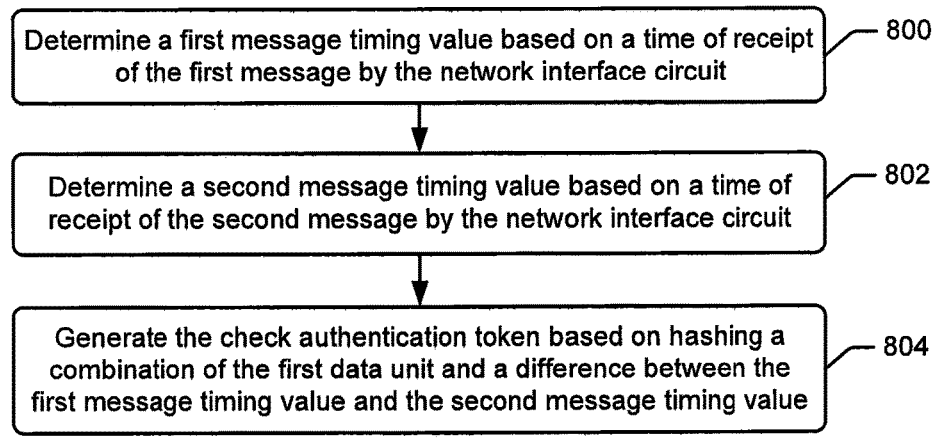

Another embodiment uses the elapsed time between messages as an input to the hashing algorithm. Referring to FIG. 8, the first network device 100 determines (block 800) a first message timing value based on a time of receipt of the first message by a network interface circuit of the first network device 100. The first network device 100 determines (block 802) second message timing value based on a time of receipt of the second message by the network interface circuit of the first network device 100. The first network device 100 then generates the check authentication token based on hashing a combination of the first data unit and a difference between the first message timing value and the second message timing value. Accordingly, the second network device 110 can demonstrate its authenticity to the first network device 100 by controlling or otherwise measuring timing between its communication of the first message and subsequent sending of the second message, and then generating the reported authentication token (e.g., block 304) based on hashing a combination of the first data unit and the elapsed time. The first network device 100 similarly hashes the first data unit and the elapsed time it measured between receipt of the first message and subsequent second message. The first and second network devices 100 and 110 may round the elapsed time values that are provided to the hashing algorithm using a same rounding technique so that timing values within a threshold range of one another will provide a same timing value to the hashing algorithm and result in the hashing output being equal.

Figure 9:
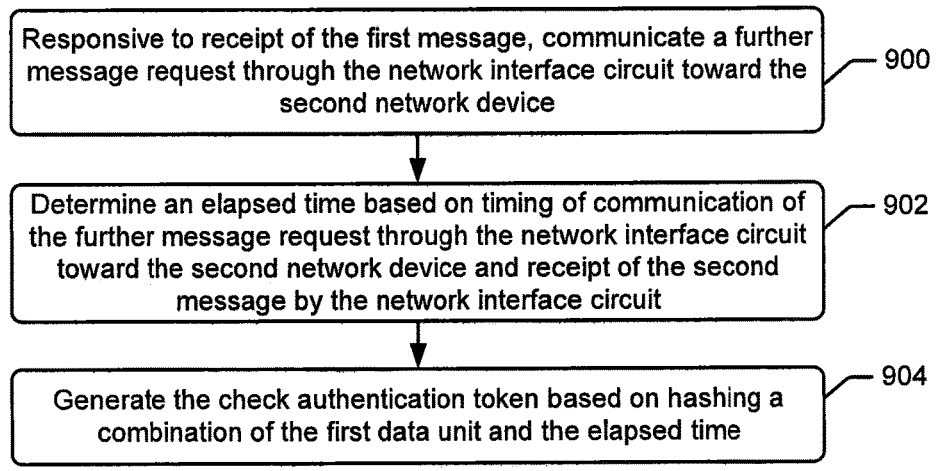

Referring to FIG. 9, the first network device 100 can respond (block 900) to receipt of the first message by communicating a further message request through the network interface circuit toward the second network device 110. The first network device 100 then determines (block 902) an elapsed time based on timing of communication of the further message request through the network interface circuit toward the second network device 110 and receipt of the second message by the network interface circuit. The first network device 100 generates (block 940) the check authentication token based on hashing a combination of the first data unit and the elapsed time.

In a further embodiment, the first network device 100 determines communication latency through a data network e.g., Internet, between the first and second communication devices 100 and 110. The elapsed time used by the first network device 100 as an input to the hashing algorithm can then be further determined based on the communication latency. For example, the first network device 100 may repetitively ping the second network device 100 to determine the communication latency and/or how much the communication latency has changing between the two devices (e.g., repetitively measure elapsed time between sending a ping message and receiving a ping response). The first network device 100 may subtract that communication latency from the measurement of elapsed time to remove the effect on vacation latency caused by changes in communication pathways through intermediate network router nodes between the first and second network devices 100 and 110. Alternatively or additionally, the first network device 100 may use the determined amount of change in the communication latency to adjust the amount of rounding that is used when determining the elapsed time (e.g., adjust the size of defined time bins into which the measurement elapsed time is selectively placed) so that smaller rounding amounts may be used when the communication latency is relatively constant and larger rounding amounts may be used when the communication latency is changing more than one or more tiered threshold amounts.

FIG. 10 is a block diagram of an example first network device 100 configured as a client terminal and a second network device 110 configured as an account server according some embodiments of the present disclosure. Similarly, the second network device 100 may be configured as the account server and the first network device 100 may be configured as the client terminal.

In the embodiment of FIG. 10, the second network device 110 communicates with the first network device 100 through a data network 120 that may include wired (e.g., private or public wide area network (e.g, Internet)) and/or wireless network elements. For example, the data network 120 may include a radio access network 122 that communicates with the account server 110 and/or the client terminal 100 using one or more wireless communication protocols, such as WLAN, WiMax, LTE or other cellular, etc. The first network device 100 may be any electronic device that can communicate with the second network device 110, such as a smart phone, tablet computer, laptop computer, desktop computer, gaming console, etc. The second network device 110 may be any type of network data server, such as an account server, website server, cloud computing server, etc.

The illustrated first network device 100 includes a processor 1060, a memory 1070, a user interface 1082, a network interface 1080, and a display device 1084. The network interface 1080 may include a radio access network transceiver and/or a wired network interface (e.g., Ethernet interface) that communicates through the network 120 with the second network device 110. The user interface 1082 may include a keyboard, touch screen input interface, speaker, and/or microphone. The processor 1060 may include one or more data processing circuits, such as a general purpose and/or special purpose processor (e.g., microprocessor and/or digital signal processor) that may be collocated or distributed across one or more networks. The processor 1060 is configured to execute computer program code in the memory 1070, described below as a non-transitory computer readable medium, to perform at least some of the operations described herein as being performed by a user terminal. The illustrated computer program code includes one or more applications 1072 that are processed by the processor 1060 to provide user directed functionality, and server authentication code 1074 which may operate according to one or more of embodiments disclosed herein for authentication operations performed by a network device.

The illustrated second network device 110 includes a processor 1010, a memory 1020, a user interface 1030, and may further include a user accounts database 1040. The network interface 1030 may include a radio access network transceiver and/or a wired network interface (e.g., Ethernet interface) that communicates through the network 120 with the first network device 100. The processor 1010 may include one or more data processing circuits, such as a general purpose and/or special purpose processor (e.g., microprocessor and/or digital signal processor) that may be collocated or distributed across one or more networks. The processor 1010 is configured to execute computer program code in the memory 1020, described below as a non-transitory computer readable medium, to perform at least some of the operations described herein as being performed by a user terminal. The illustrated computer program code includes program code 1022 that is processed by the processor 1010 to provide account server operations, and terminal authentication code 1024 which may operate according to one or more of embodiments disclosed herein for authentication operations performed by a network device.

The second network device 110 can be configured as an account server that includes a user accounts database 1040. The terminal authentication code 1024 and/or the program code 1022 can control whether and/or how much access the first network device 100 and other network devices are provided to user information stored in the user accounts database 1040 based on performing authentication of the sources of messages requesting such access. For example, the terminal authentication code 1024 can generate a check authentication token which is compared to the reported authentication token contained in a message from the first network device 100 requesting access to user information stored in the user accounts database 1040, and responsive to the check authentication token not matching the reported authentication token, prevents electronic access requested by the first network device 100 to user information identified by the second data unit that is stored in the user accounts database 1040. In contrast, responsive to the check authentication token matching the reported authentication token, the second network device 110 can retrieve the user information identified by the second data unit from the user accounts database 1040, and communicate the user information through the network interface circuit 1030 toward the first network device 100 through the network 120.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium, A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks, The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms first, second, etc. may be used herein to describe various messages, operations, and/or components, these messages, operations, and/or components should not be limited by these terms. These terms are only used to distinguish one message, operation, and/or component from another message, operation, and/or component. Thus, a first message, operation, and/or component discussed herein could be termed a second message, operation, and/or component without departing from the teachings of the present disclosure.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were, chosen and described in order to best explain the principles of the disclosure and the practical application, and to enable others of ordinary skill in the art to understand the disclosure with various modifications as are suited to the particular use contemplated.

The invention claimed is:

1. A method, comprising:
    performing, by an authentication processor of a first network device:
        receiving a first message through a network interface circuit from a second network device, the first message containing a first data unit to be operated upon by the first network device;
        receiving a second message through the network interface circuit from the second network device, the second message containing a reported authentication token for the second network device and a second data unit to be operated upon by the first network device, wherein the first message is received before receipt of the second message;

determining a sequence location of the first message within a sequence of messages received from the second network device before receipt of the second message;

selecting one of a plurality of data units contained in the first message as the first data unit, based on the sequence location;

determining a first message timing value based on a time of receipt of the first message by the network interface circuit;

determining a second message timing value based on a time of receipt of the second message by the network interface circuit, generating a check authentication token based on hashing the first data unit, including by generating the check authentication token based on hashing a combination of the first data unit and a difference between the first message timing value and the second message timing value; and selectively performing a command on the second data unit that controls operation of the first network device based on whether the check authentication token matches the reported authentication token.

2. The method of claim 1, wherein:

the determining a sequence location of the first message within a sequence of messages received from the second network device before receipt of the second message, comprises generating a count of a number of messages in the sequence received from the second network device during a same session established between the first network node and the second network node; and the selecting one of a plurality of data units contained in the first message as the first data unit, based on the sequence location, comprises selecting one of the plurality of data units contained in the first message as the first data unit, based on the count.

3. The method of claim 1, wherein the generating a check authentication token based on hashing the first data unit, further comprises:

selecting a set of data units from among a greater plurality of data units contained in the first message based on the sequence location, the set of data units including the first data unit; and generating the check authentication token based on hashing the set of data units.

4. The method of claim 1, further comprising:

receiving a plurality of messages through the network interface circuit from the second network device, each of the plurality of messages containing a data unit to be operated upon by the first network device;

determining a sequence location of the second message within the plurality of messages; and selecting one of the plurality of messages as a selected message based on the sequence location of the second message, wherein the generating a check authentication token based on hashing the first data unit, comprises generating the check authentication token based on hashing a combination of the first data unit and the data unit from the selected message.

5. The method of claim 1, further comprising:

receiving a plurality of messages through the network interface circuit from the second network device, each of the plurality of messages containing a data unit to be operated upon by the first network device;

determining a sequence location of the second message within the plurality of messages; and selecting a subset of messages from among the plurality of messages based on the sequence location of the second message, wherein the generating a check authentication token based on hashing the first data unit, comprises generating the check authentication token based on hashing a combination of the first data unit and a data unit from each of the subset of messages.

6. The method of claim 1, further comprising:

receiving a plurality of messages through the network interface circuit from the second network device, each of the plurality of messages containing a data unit to be operated upon by the first network device;

for each of the plurality of messages that are received, generating the check authentication token based on hashing a combination of the data unit in the message received and an earlier check authentication token generated based on hashing the data unit in an earlier received message.

7. The method of claim 1, further comprising:

responsive to receipt of the first message, communicating a further message request through the network interface circuit toward the second network device; and determining an elapsed time based on timing of communication of the further message request through the network interface circuit toward the second network device and receipt of the second message by the network interface circuit, wherein the generating a check authentication token based on hashing the first data unit, comprises generating the check authentication token based on hashing a combination of the first data unit and the elapsed time.

8. The method of claim 7, further comprising:

determining communication latency through a data network between the first and second communication devices, wherein the elapsed time is further determined based on the communication latency.

9. The method of claim 1, wherein the selectively performing a command on the second data unit that controls operation of the first network device based on whether the check authentication token matches the reported authentication token, comprises:

determining whether the check authentication token matches the reported authentication token;

discarding the second data unit responsive to determining the check authentication token does not match the reported authentication token; and providing the second data unit to an application programming interface of an application responsive to determining the check authentication token matches the reported authentication token.

10. The method of claim 1, wherein the selectively performing a command on the second data unit that controls operation of the first network device based on whether the check authentication token matches the reported authentication token, comprises:

determining whether the check authentication token matches the reported authentication token;

responsive to determining the check authentication token does not match the reported authentication token, preventing electronic access requested by the second network device to user information identified by the second data unit that is stored in a user information repository; and responsive to determining the check authentication token matches the reported authentication token, retrieving the user information identified by the second data unit from the user information repository, and communicating the user information through the network interface circuit toward the second network device.

11. A first network device comprising:

a network interface configured to communicate with a second network device through a data network;

an authentication processor; and a memory coupled to the authentication processor and storing computer readable program code that when executed by the authentication processor causes the authentication processor to perform operations comprising:

receiving a first message through the network interface circuit from the second network device, the first message containing a first data unit to be operated upon by the first network device;

receiving a second message through the network interface circuit from the second network device, the second message containing a reported authentication token generated by the second network device and a second data unit to be operated upon by the first network device;

determining a sequence location of the first message within a sequence of messages received from the second network device before receipt of the second message;

selecting one of a plurality of data units contained in the first message as the first data unit, based on the sequence location;

determining a first message timing value based on a time of receipt of the first message by the network interface circuit;

determining a second message timing value based on a time of receipt of the second message by the network interface circuit, generating a check authentication token based on hashing the first data unit, including by generating the check authentication token based on hashing a combination of the first data unit and a difference between the first message timing value and the second message timing value; and selectively performing a command on the second data unit that controls operation of the first network device based on whether the check authentication token matches the reported authentication token.

12. The first network device of claim 11, wherein the generating a check authentication token based on hashing the first data unit, further comprises:

selecting a set of data units from among a greater plurality of data units contained in the first message based on the sequence location, the set of data units including the first data unit; and generating the check authentication token based on hashing the set of data units.

13. The first network device of claim 11, further comprising:

receiving a plurality of messages through the network interface circuit from the second network device, each of the plurality of messages containing a data unit to be operated upon by the first network device;

determining a sequence location of the second message within the plurality of messages; and selecting one of the plurality of messages as a selected message based on the sequence location of the second message, wherein the generating a check authentication token based on hashing the first data unit, comprises generating the check authentication token based on hashing a combination of the first data unit and the data unit from the selected message.

14. The first network device of claim 11, further comprising:

receiving a plurality of messages through the network interface circuit from the second network device, each of the plurality of messages containing a data unit to be operated upon by the first network device;

determining a sequence location of the second message within the plurality of messages; and selecting a subset of messages from among the plurality of messages based on the sequence location of the second message, wherein the generating a check authentication token based on hashing the first data unit, comprises generating the check authentication token based on hashing a combination of the first data unit and a data unit from each of the subset of messages.

15. The first network device of claim 11, wherein the selectively performing a command on the second data unit that controls operation of the first network device based on whether the check authentication token matches the reported authentication token, comprises:

determining whether the check authentication token matches the reported authentication token;

responsive to determining the check authentication token does not match the reported authentication token, preventing electronic access requested by the second network device to user information identified by the second data unit that is stored in a user information repository; and responsive to determining the check authentication token matches the reported authentication token, retrieving the user information identified by the second data unit from the user information repository, and communicating the user information through the network interface circuit toward the second network device.

16. A computer program product, comprising:

a non-transitory computer readable storage medium comprising computer readable program code embodied in the medium that when executed by an authentication processor of a first network device causes the processor to perform operations comprising:

receiving a first message through a network interface circuit from a second network device, the first message containing a first data unit to be operated upon by the first network device;

receiving a second message through the network interface circuit from the second network device, the second message containing a reported authentication token for the second network device and a second data unit to be operated upon by the first network device, wherein the first message is received before receipt of the second message;

determining a sequence location of the first message within a sequence of messages received from the second network device before receipt of the second message;

selecting one of a plurality of data units contained in the first message as the first data unit, based on the sequence location;

determining a first message timing value based on a time of receipt of the first message by the network interface circuit;

determining a second message timing value based on a time of receipt of the second message by the network interface circuit, generating a check authentication token based on hashing the first data unit, including by generating the check authentication token based on hashing a combination of the first data unit and a difference between the first message timing value and the second message timing value; and selectively performing a command on the second data unit that controls operation of the first network device based on whether the check authentication token matches the reported authentication token.

17. The method of claim 1, wherein the first network node selectively performs a command identified by the first data unit, selected from the first message, based on whether the check authentication token matches the reported authentication token.

18. The method of claim 1, wherein the first network node selectively performs the command using an operand value contained in the first data unit, selected from the first message, based on whether the check authentication token matches the reported authentication token.

* * * * *